(12) United States Patent
Motomura et al.

(10) Patent No.: US 8,076,645 B2
(45) Date of Patent: Dec. 13, 2011

(54) COMPTON IMAGING CAMERA

(75) Inventors: Shinji Motomura, Wako (JP); Shuichi Enomoto, Wako (JP)

(73) Assignee: Riken, Saitama (JP)

( * ) Notice: Subject to any disclaimer, the term of this patent is extended or adjusted under 35 U.S.C. 154(b) by 159 days.

(21) Appl. No.: 12/377,250

(22) PCT Filed: Aug. 9, 2007

(86) PCT No.: PCT/JP2007/065593
§ 371 (c)(1),
(2), (4) Date: Jun. 17, 2009

(87) PCT Pub. No.: WO2008/018534
PCT Pub. Date: Feb. 14, 2008

(65) Prior Publication Data
US 2010/0176303 A1    Jul. 15, 2010

(30) Foreign Application Priority Data

Aug. 11, 2006    (JP) .................................. 2006-220446

(51) Int. Cl.
*G01T 1/24* (2006.01)
(52) U.S. Cl. ................................................. 250/370.09
(58) Field of Classification Search .............. 250/370.09
See application file for complete search history.

(56) References Cited

U.S. PATENT DOCUMENTS

2004/0084624 A1* 5/2004 Meng et al. ................. 250/363.1
2005/0139775 A1* 6/2005 Gono et al. ............. 250/370.09

FOREIGN PATENT DOCUMENTS

| JP | 62-203078 | 9/1987 |
|---|---|---|
| JP | 9-101371 A | 4/1997 |
| JP | 2004-125757 | 4/2004 |
| JP | 2005-208057 A | 8/2005 |

OTHER PUBLICATIONS

Takahashi, T. et al., "A Si/CdTe Compton Camera for gamma-ray lens experiment," Exp. Astros. 20:317-331 (2005).
Oonuki, K. et al., "Results of a Si/CdTe Compton Telescope," http://arxiv.org/abs/astro-ph/050948v1, Sep. 21, 2005, [accessed Mar. 10, 2010), 11 pages.
Tanaka et al., "Development of a Si/CdTe semiconductor Compton telescope," Proceedings of SPIE, vol. 5501, pp. 229-240 (2004).
English language translation of the Written Opinion dated Aug. 30, 2007, for PCT/JP2007/065593, published as WO 2008/018534, on Feb. 14, 2008, and entitled "Gamma Ray Detector" (8 pages).
Burks, M. et al., "Imaging Performance of the Si/Ge Hybrid Compton Imager," 2005 IEEE Nuclear Science Symposium Conference Record, vol. 1, pp. 6-10 (2005).
Dogan, N. et al., "Multiple Compton scattering gamma ray imaging camera," Nuclear Instruments and Methods in Physics Research vol. A299, pp. 501-506 (1990).

(Continued)

*Primary Examiner* — Constantine Hannaher
(74) *Attorney, Agent, or Firm* — Fish & Richardson P.C.

(57) ABSTRACT

A gamma ray detector is provided that increases a detectable energy range. A position-sensitive gamma ray detecting element for low energy gamma rays 101 that can detect an interaction position and energy of a gamma ray is disposed in front of a pair of position-sensitive gamma ray detecting elements for high energy gamma rays 102 and 103 that can detect an interaction position and energy of a gamma ray.

3 Claims, 11 Drawing Sheets

OTHER PUBLICATIONS

Written Opinion dated Aug. 30, 2007, for PCT/JP2007/065593, published as WO 2008/018534, on Feb. 14, 2008, and entitled "Gamma Ray Detector" (5 pages) [In Japanese language, translation to be provided at a later date].

English language translation of the International Search Report dated Sep. 11, 2007, for PCT/JP2007/065593, published as WO 2008/018534, on Feb. 14, 2008, and entitled Gamma Ray Detector (2 pages).

* cited by examiner

| t1 | t2 | t3 | t4 | E1 | A1+ | A1- | E2 | A2+ | A2- | E3 | A3+ | A3- | E4 | A4+ | A4- |

COMPTON IMAGING CAMERA

CROSS-REFERENCE TO RELATED APPLICATIONS

This application is a national stage application of and claims the benefit of PCT Application No. PCT/JP2007/065593, filed on Aug. 9, 2007, and published as WO 2008/018534, which claims priority to Japanese Patent Application No. 2006-220446, filed on Aug. 11, 2006. The disclosure of the prior applications is considered part of (and is incorporated by reference in) the disclosure of this application.

TECHNICAL FIELD

The present invention relates to a gamma ray detector, and more particularly to a gamma ray detector that can detect an arrival direction of gamma rays.

BACKGROUND ART

A gamma ray detector that utilizes the kinematics of Compton scattering is disclosed in JP Patent Publication (Kokai) No. 9-101371 A (1997) or JP Patent Publication (Kokai) No. 2005-208057 A as a gamma ray detector that can detect the position of a gamma-ray source or an arrival direction of gamma rays without using a collimator. The aforementioned gamma ray detector uses two germanium detecting elements that have a position resolution and an energy resolution, and focuses on a gamma ray detection event in which a gamma ray incident on a front germanium detecting element undergoes Compton scattering, and thereafter the scattered gamma rays are incident and absorbed by a rear germanium detecting element to thereby calculate a position or a direction in which a gamma-ray source exists based on the detected positions and detected energy of the gamma ray at the two germanium detecting elements. In "T. Tanaka et al.: 'Development of a Si/CdTe semiconductor Compton telescope', Proceedings of SPIE 5501 (2004) pp. 229-240", an image pickup apparatus for gamma-ray astronomy is described that applies the same principle by combining a silicon detecting element and a cadmium telluride (CdTe) detecting element.

Patent Document 1: JP Patent Publication (Kokai) No. 9-101371 A (1997)
Patent Document 2: JP Patent Publication (Kokai) No. 2005-208057 A
Non-Patent Document 1: Proceedings of SPIE 5501 (2004), pp. 229-240

DISCLOSURE OF THE INVENTION

Problems to be Solved by the Invention

A gamma ray detector that uses two germanium detecting elements is capable of detecting gamma rays over a wide energy range. However, when the energy of a gamma ray is low, the probability of photoelectric absorption occurring in a germanium crystal increases, and the sensitivity of gamma ray detection utilizing Compton scattering decreases. FIG. 1 is a view that illustrates the relationship between the probability of Compton scattering occurring and germanium thickness, taking gamma ray energy as a parameter. As will be understood from the figure, when the gamma ray energy drops to around 100 keV, the probability of Compton scattering occurring remains at approximately 20% irrespective of how thick the germanium crystal is made, and the detection efficiency drops remarkably. Further, as described in "Proceedings of SPIE 5501 (2004) pp. 229-240", when a silicon semiconductor detecting element is used as a front-side detecting element, it is possible to improve the Compton scattering occurrence probability with respect to gamma rays of lower energy in comparison to the use of germanium. However, in this case, gamma rays of approximately 200 keV or more tend to pass through the silicon detecting element, and the probability of Compton scattering occurring decreases.

An object of the present invention is to provide a gamma ray detector that increases a detectable energy range.

Means for Solving the Problems

A position-sensitive silicon detecting element is added in front of two position-sensitive germanium detecting elements. As a result, Compton scattering of low-energy gamma rays occurs mainly at the silicon detecting element, and scattered gamma rays are detected with the germanium detecting elements to the rear thereof. Further, since high-energy gamma rays tend to pass through the silicon detecting element, high-energy gamma rays undergo Compton scattering mainly at the germanium detecting element at the next stage, and the scattered gamma rays are detected with a rearmost detecting element. Accordingly, it is possible to pick-up images of low-energy to high-energy gamma rays with a high efficiency. As a result, SPECT nuclear imaging for in vivo diagnosis that discharges low-energy gamma rays which has heretofore been difficult to perform with a gamma-ray image pickup apparatus using two germanium detecting elements is also enabled.

FIG. 2 is a view that illustrates the relationship between the probability of Compton scattering occurring and crystal thickness with respect to germanium crystals and silicon crystals. As is apparent from the figure, by using silicon as a raw material for a detecting element at the first stage, the probability of Compton scattering occurring can be improved even for a gamma ray with energy of approximately 100 keV. Accordingly, use of silicon for a first-stage detecting element and use of germanium or CdTe for a second-stage detecting element can be considered. However, since the probability of Compton scattering occurring is higher for germanium than silicon when the gamma ray energy reaches approximately 200 keV or more, an apparatus such as Si+CdTe is not suited for detection of high-energy gamma rays.

Thus, according to the present invention a configuration is employed in which a gamma ray detecting element (hereunder, referred to as "gamma ray detecting element for low energy") that exhibits a high Compton scattering occurrence probability with respect to relatively low energy gamma rays is disposed in front of two gamma ray detecting elements (hereunder, referred to as "gamma ray detecting element for high energy") that exhibit a high Compton scattering occurrence probability with respect to relatively high energy gamma rays.

More specifically, the gamma ray detector of the present invention comprises a pair of position-sensitive gamma ray detecting elements for high-energy gamma rays that can detect an interaction position and an energy of a gamma ray, and a position-sensitive gamma ray detecting element for low-energy gamma rays that can detect an interaction position and an energy of a gamma ray and which is disposed in front of the pair of position-sensitive gamma ray detecting elements for high-energy gamma rays. The position-sensitive gamma ray detecting elements for high-energy gamma rays comprise germanium crystals, and the position-sensitive gamma ray detecting element for low energy gamma rays comprises silicon crystals.

It can be assumed that the position-sensitive gamma ray detecting element for low-energy gamma rays is a detecting element that typically results in a higher Compton scattering occurrence probability with respect to gamma rays of energy 100 keV compared to the position-sensitive gamma ray detecting elements for high-energy gamma rays, and results in a lower Compton scattering occurrence probability with respect to gamma rays of energy 1000 keV compared to the position-sensitive gamma ray detecting elements for high-energy gamma rays Advantage of the Invention According to the present invention, it is possible to detect with high efficiency gamma rays extending over a wide energy range from low-energy gamma rays to high-energy gamma rays.

DESCRIPTION OF SYMBOLS

Figure 1:
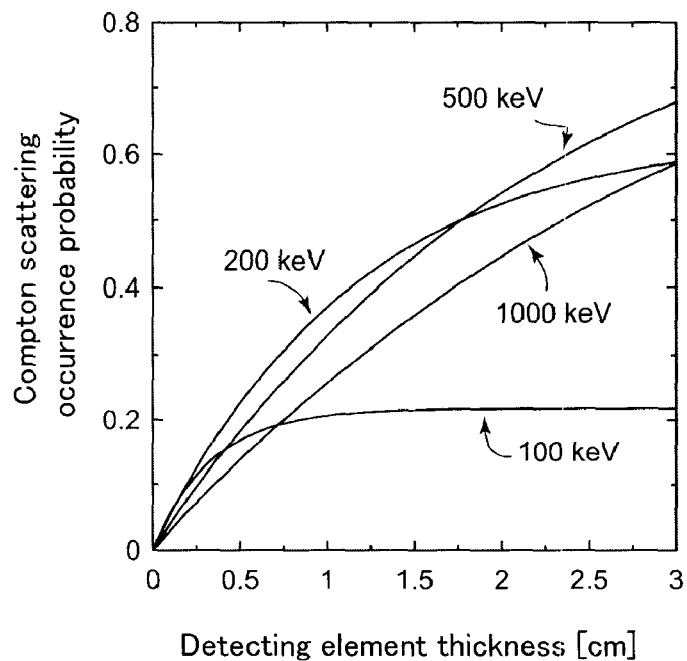
FIG. 1 is a view for explaining the probability of Compton scattering occurring.
Figure 2:
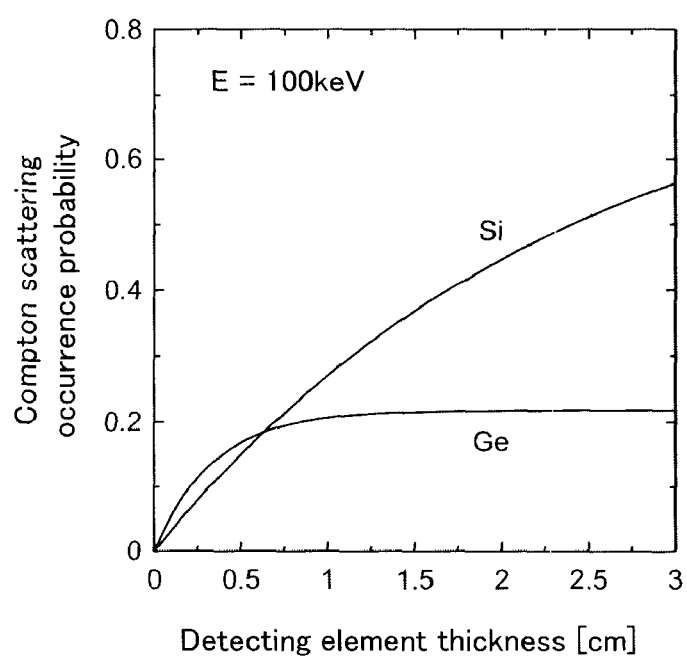
FIG. 2 is a view that illustrates the relationship between crystal thickness and the probability of Compton scattering occurring with respect to a germanium crystal and a silicon crystal.

10 Detection section
11 Scattering detector
12 Absorption detector
13 Gamma-ray source
14, 15 Gamma ray
20 Gamma-ray detector crystal
21 Anode strip
22 Cathode strip
31 Preamplifier
32 Signal processing circuit
33 Coincidence detection circuit
34 Delay circuit
35 Time difference recorder
36 Wave height recorder
37 Computer
41 Waveform discriminator
42 Amplitude measuring device
43 Shaping amplifier
44 TFA
45 CFD
101 First-stage detecting element
102 Second-stage detecting element
103 Third-stage detecting element

BEST MODE FOR CARRYING OUT THE INVENTION

Embodiments of the present invention are described below with reference to the drawings.

Figure 3:
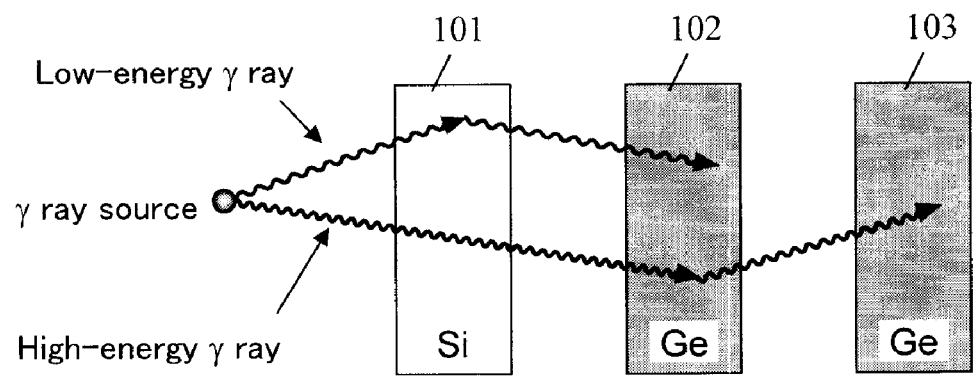
FIG. 3 is a schematic diagram that illustrates the disposition of gamma ray detecting elements in a gamma ray detector according to the present invention.

FIG. 3 is a schematic diagram that illustrates the disposition of gamma ray detecting elements in a gamma ray detector according to the present invention. The gamma ray detector according to the present invention has a configuration in which a first-stage detecting element 101, a second-stage detecting element 102, and a third-stage detecting element 103 are aligned in parallel in that order from a side from which gamma rays are incident. The first-stage detecting element 101 is a gamma ray detecting element for low energy that comprises a silicon semiconductor detecting element. The second-stage detecting element 102 and the third-stage detecting element 103 are each a gamma ray detecting element for high energy that comprise a germanium semiconductor detecting element. Diamond may also be used as the material of the first-stage detecting element 101. Further, the third-stage detecting element 103 can be substituted with a CdTe detecting element or a CdZnTe detecting element with a larger atomic number or the like. Each gamma ray detecting element is a position-sensitive semiconductor detecting element that is capable of measuring the position of a point of interaction with a gamma ray as well as an energy imparted to the detecting element by the interaction according to the principle described hereunder.

A gamma ray of a low energy of approximately 100 keV that is discharged from a gamma-ray source mainly undergoes Compton scattering at the first-stage silicon detecting element. If it is assumed that the scattered gamma ray undergoes photoelectric absorption at the second-stage and third-stage germanium detecting element, the scattering angle can be determined by substituting the energy values measured at the respective detecting elements into the kinematics equation for Compton scattering. That is, an opening angle cone that is double the scattering angle is defined that takes a straight line that passes through two measured interaction points as an axis and takes the interaction point in the first-stage detecting element as the vertex. Further, a high-energy gamma ray of approximately 200 keV or more that is discharged from the gamma-ray source tends to pass through the first-stage silicon detecting element to undergo Compton scattering mainly at the second-stage germanium detecting element. If it is assumed that the scattered gamma ray undergoes photoelectric absorption at the third-stage detecting element, then, similarly to the case of the low energy gamma ray, an opening angle cone that is double the scattering angle is defined that takes a straight line that passes through two measured interaction points as an axis and takes the interaction point in the second-stage detecting element as the vertex. More specifically, it is possible to perform highly efficient imaging of low-energy to high-energy gamma rays by the Compton camera method.

Next, a principle for detecting a gamma-ray source by means of the gamma ray detector of the present invention is described. In this case, attention is focused on an event in which, among two detecting elements that detect an interaction with a gamma ray, the gamma ray undergoes Compton scattering at the detecting element nearer the gamma-ray source and undergoes photoelectric absorption at the detecting element further from the gamma-ray source. Therefore, the former detecting element is called a "scattering detector" and the latter detecting element is called an "absorption detector". Of the detecting elements shown in FIG. 3, the first-stage detecting element 101 or the second-stage detecting element 102 may be the scattering detector. In a case in which the first-stage detecting element 101 is the scattering detector, the second-stage detecting element 102 and the third-stage detecting element 103 may be an absorption detector. Further, in a case in which the second-stage detecting element 102 is the scattering detector, the third-stage detecting element 103 may be the absorption detector.

Figure 4:
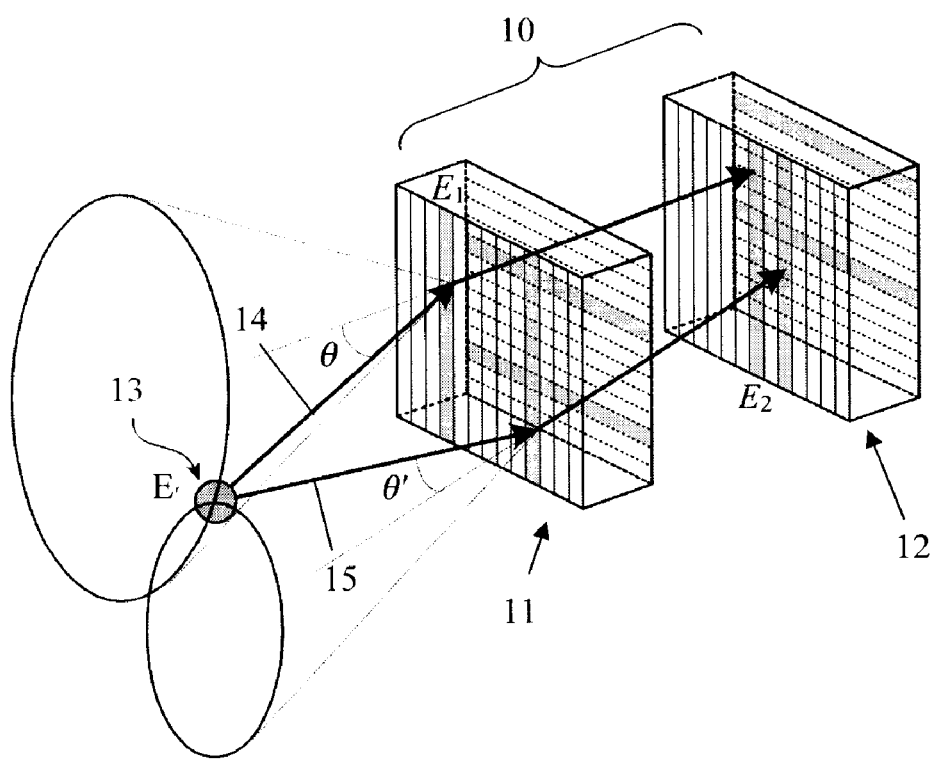
FIG. 4 is a schematic configuration view of a detection section of a gamma-ray image pickup apparatus according to the present invention, and a view that illustrates a principle for detecting a gamma-ray source.

FIG. 4 is a view that illustrates the principle for detecting a gamma-ray source by means of a scattering detector and an absorption detector.

After the illustrated gamma rays 14 and 15 are incident on a scattering detector 11 and undergo Compton scattering, the scattered gamma rays are incident on an absorption detector 12 and lose all energy there. The present invention focuses on this event. In this connection, it is assumed that the gamma ray 14 and the gamma ray 15 are incident on a detection section 10 at separate times.

At this time, for example, the gamma ray 14 imparts an energy of $E_1$ to the scattering detector 11 at the front, and imparts an energy of $E_2$ to the absorption detector 12 at the rear. Thus, the relationship of the following formula (1) is established.

$$E=E_1+E_2 \quad (1)$$

A nuclide can be identified by the measured energy E. Further, the Compton scattering angle θ is calculated based on the kinematics of Compton scattering according to the following formula (2). Where, $m_c$ is the rest mass of an electron, and c is optical velocity.

$$\cos\theta = 1 + m_c c^2 \left( \frac{1}{E} - \frac{1}{E-E_1} \right) \quad (2)$$

It is known from these relationships that the gamma-ray source 13 can be found on a circular cone whose vertex angle is 2θ with respect to a straight line that connects an interaction point at which the gamma ray 14 caused Compton scattering in the scattering detector 11 and an interaction point at which the scattered gamma ray is absorbed by the absorption detector 12. Accordingly, two or more such events are measured, and circular cones are formed for each combination. When a position at which these circular cones overlap is determined, the position is a candidate for the position at which the gamma-ray source 13 exists. As the measured number of events, i.e. the number of circular cones, increases, an area in which the circular cones overlap with each other can be narrowed and the position at which a gamma-ray source exists can be determined with high accuracy.

Figure 5:
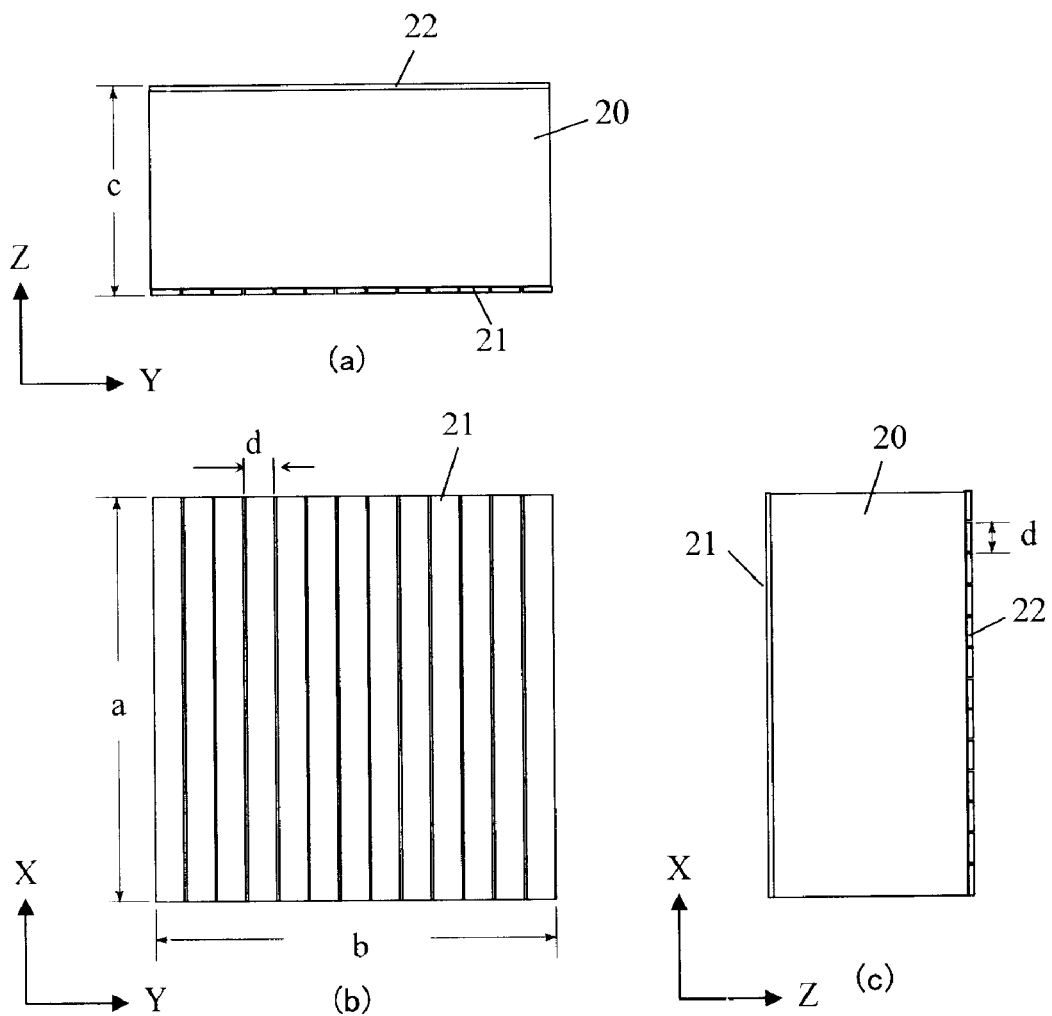
FIG. 5 is a view that illustrates a construction example of a divided-electrode-type planar gamma ray detecting element according to the present invention.

FIG. 5 is a view for illustrating construction examples of individual gamma ray detecting elements, in which (a) is a top view, (b) is a front view, and (c) is a side view. However, a gamma ray detecting element that can be used with the present invention is not limited to the detecting elements having the structures shown in FIG. 5, and any kind of detecting element can be used as long as the detecting element is a gamma ray detecting element that can detect an interaction position and an energy with respect to a gamma ray.

An X, Y, and Z coordinate system is set as illustrated in the drawing and this coordinate system is used for the description. This detecting element forms an electrode that is divided in a rectangular shape on both surfaces of a planar gamma-ray detector crystal 20 with dimensions a×b×c. Multiple electrode strips 21 of width d and length a that are elongated in the X direction are tightly aligned on one surface of the planar gamma-ray detector crystal 20. Further, multiple electrode strips 22 of width d and length b that are elongated in the Y direction are tightly aligned on the surface on the opposite side of the planar gamma-ray detector crystal 20. The electrode strips on the one surface are used as anodes (hereinafter referred to as "anode strip"), and the electrode strips on the surface on the opposite side are used as cathodes (hereinafter referred to as "cathode strip"). The multiple anode strips 21 and cathode strips 22 that extend in mutually intersecting directions in this manner are respectively provided on the front and rear surfaces of the planar gamma-ray detector crystal 20. Rough X-Y coordinates of an interaction point are known from a combination of the anode strips and cathode strips in which a signal caused by interaction between a gamma ray and a gamma-ray detector crystal is detected strongly.

Hereunder, as one example, assuming that a=39 mm, b=39 mm, c=20 mm, and d=3 mm, a case is described in which an electrode on a gamma ray incidence side is taken to be an anode, and an electrode on the opposite side is taken to be a cathode. First, a method for determining a DOI (Depth of interaction) position in the depth direction from a crystal surface of an interaction point of a gamma ray inside the gamma-ray detector crystal 20 is described.

Figure 6:
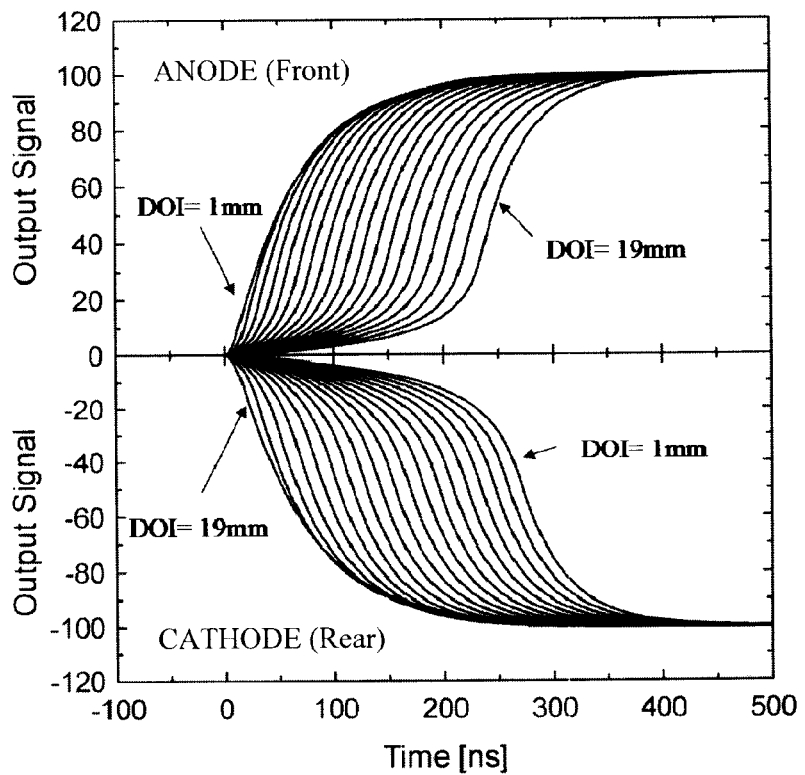
FIG. 6 is a view for simulating output signals of an anode and a cathode of the divided-electrode-type planar gamma ray detecting element.

FIG. 6 is a view for simulating an output signal generated from anode strips and cathode strips when a gamma ray interacts with a gamma-ray detector crystal inside a divided-electrode-type planar gamma ray detecting element. The illustrated signal is a signal that is generated from the anode strips and cathode strips nearest to an interaction point. The signal waveform changes according to a DOI (Depth of interaction) position in the depth direction of the interaction point of the gamma ray.

Figure 7:
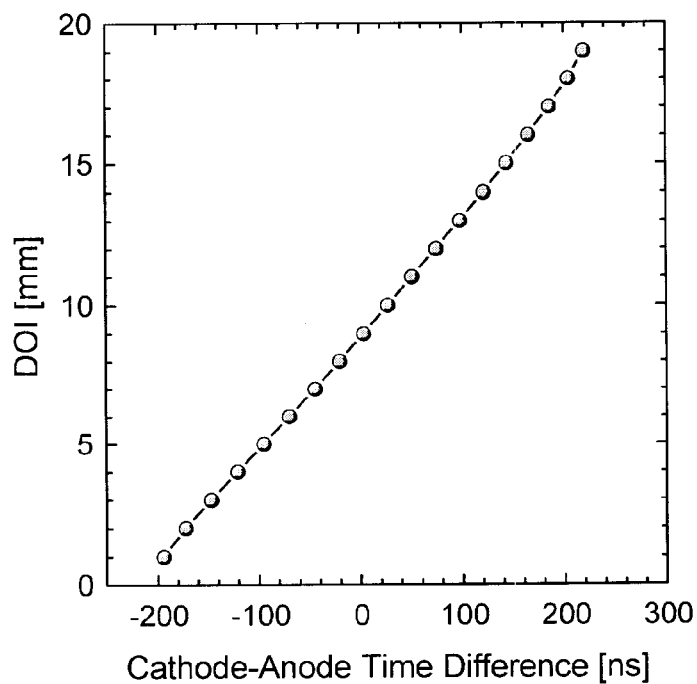
FIG. 7 is a view that illustrates the relationship between DOI and a time difference until an amplitude of a signal waveform reaches a maximum value of 50% between an anode and a cathode.

FIG. 7 illustrates the relationship between a difference in the time until the amplitude of a signal waveform detected by the anode strip 21 reaches 50% of the maximum value and the time until the amplitude of the signal waveform detected by the cathode strip 22 reaches 50% of the maximum value, and DOI with regard to a single detection event. It is found that this time difference and the DOI have an almost linear relationship. Accordingly, when the relationship shown in FIG. 7 is stored, and when the measured time difference is applied to the relationship of FIG. 7, the DOI, that is, the depth from the surface of a gamma-ray detector crystal at an interaction point can be known.

When a gamma ray interacts with a gamma-ray detector crystal inside a divided-electrode-type planar gamma ray detecting element, signals are generated from multiple anode strips provided on the front surface (gamma ray incidence side) of the detecting element. However, the signal generated from the anode strip located nearest to an interaction point exhibits the maximum amplitude. Similarly, among signals generated from multiple cathode strips that are provided on the rear surface of the detecting element so as to intersect with the anode strips, the signal generated from the cathode strip nearest to the interaction point exhibits the maximum amplitude. Accordingly, the X-Y coordinates of the interaction point can be known from the position of the anode strip that exhibits the maximum signal amplitude among the multiple anode strips and the position of the cathode strip that exhibits the maximum signal amplitude among the multiple cathode strips. However, because the electrode strip has width d, the X coordinate and Y coordinate of the interaction point that can be known by this method include an error of a maximum of d/2 (d=3 mm in the illustrated example), respectively. Accordingly, in the present invention, the X-Y coordinates of the interaction point are determined with an accuracy that is smaller than the width of the electrode strip according to the method described below.

Figure 8:
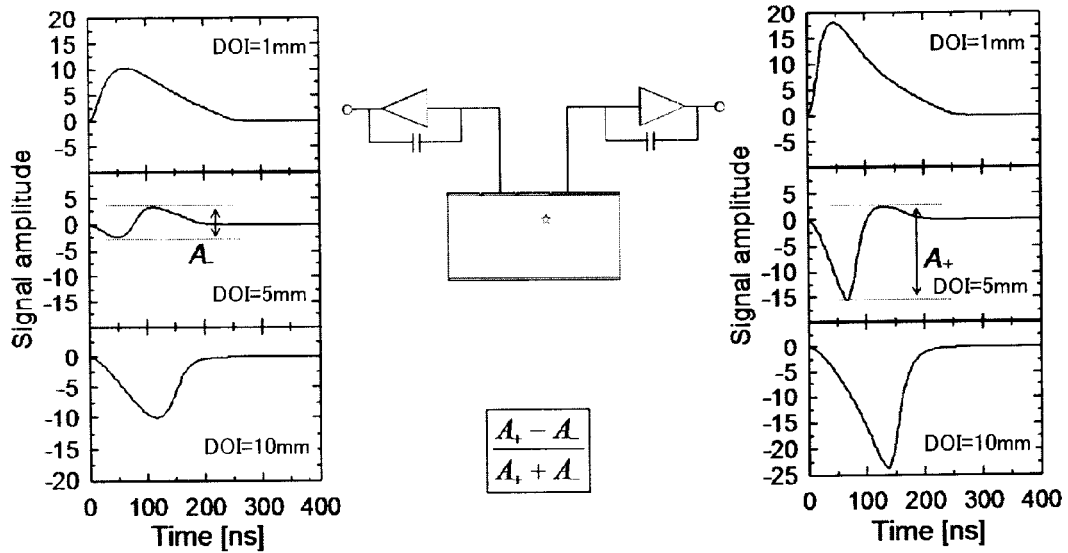
FIG. 8 is an explanatory view of a method for measuring a position in a lateral direction of an interaction point of a gamma ray.

FIG. 8 is a view that describes a method of measuring with high accuracy the crosswise position of an interaction point between a gamma-ray detector crystal and a gamma ray, that is, the position within the width of an electrode strip. When the gamma ray interacts with the gamma-ray detector crystal inside a divided-electrode-type planar gamma ray detecting element, as described previously, a signal is detected from multiple anode strips provided on the front surface of the detecting element, and the signal generated from the anode strip nearest to the interaction point exhibits the maximum amplitude. Similarly, a signal is also detected from multiple cathode strips provided on the rear surface of the detector, and the signal generated from the cathode strip nearest to the interaction point exhibits the maximum amplitude.

FIG. 8 is a view that shows signal waveforms detected by the electrode strips on the two sides adjacent to the electrode strip that exhibits the maximum signal amplitude. The graph on the left side in FIG. 8 shows the signal waveform of the electrode strip on the immediate left of the electrode strip that exhibits the maximum signal amplitude, and the graph on the right side shows the signal waveform of the electrode strip on the immediate right of the electrode strip that exhibits the maximum signal amplitude. FIG. 8 is a view that simulates signal waveforms when DOI=1 mm, 5 mm, and 10 mm from the top, respectively. TOIs (transverse positions of interaction) from the center line of the 3 mm-wide electrode strip at an interaction point are all equal and measure 1 mm. When the maximum amplitude of the signal waveform of the adjacent electrode strip on the right is taken as $A_+$, and the maximum amplitude of the signal waveform of the adjacent electrode strip on the left is taken as $A_-$, parameter L represented by the following formula is calculated.

$$L = \frac{A_+ - A_-}{A_+ + A_-} \qquad (3)$$

Figure 9:
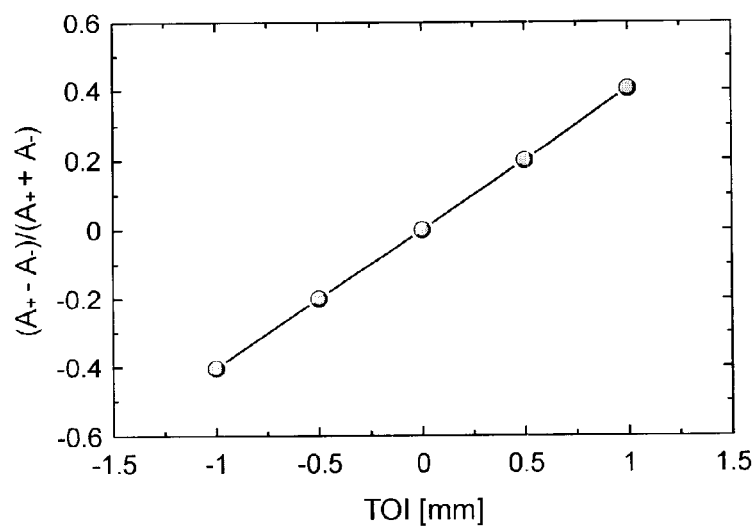
FIG. 9 is a view that illustrates the relationship between the TOI and a parameter defined in FIG. 6.

FIG. 9 is a view that illustrates the relationship between TOI and the parameter L defined by the above formula (3). As illustrated, the TOI and the parameter L have an almost linear relationship. Accordingly, when the relationship shown in FIG. 9 is stored, and the parameter L that is calculated based on the amplitudes $A_+$ and $A_-$ measured based on the signal waveforms of the adjacent electrode strips on both sides of an electrode strip that exhibits the maximum signal amplitude is applied to the relationship shown in FIG. 9, the TOI, that is, the position of the interaction point of a gamma ray within the width d of the electrode can be known with high accuracy. When this operation is performed with regard to the long and narrow anode strip 21 in the direction of the X axis, the Y coordinate position of the interaction point can be obtained with high accuracy. Moreover, when this operation is performed with regard to the long and narrow cathode strip 22 in the direction of Y axis, the X coordinate position of the interaction point can be obtained with high accuracy.

Whether a strip is nearest to an interaction point or is a strip adjacent to the nearest strip can be identified using a difference in the signal waveform obtained from those strips. For the signal of the strip nearest to the interaction point, for example, a wave height is ±100 at 500 ns in FIG. 6, while for the signal from the adjacent strips, for example, the wave height is 0 at 300 ns in FIG. 8. Accordingly, when a wave discriminator for identifying a difference in this waveform is manufactured and applied, both the nearest strip and the adjacent strips can be identified, and it then known whether a strip is a strip (DOI strip) for detecting DOI or a strip (TOI strip) for detecting TOI.

Figure 10:
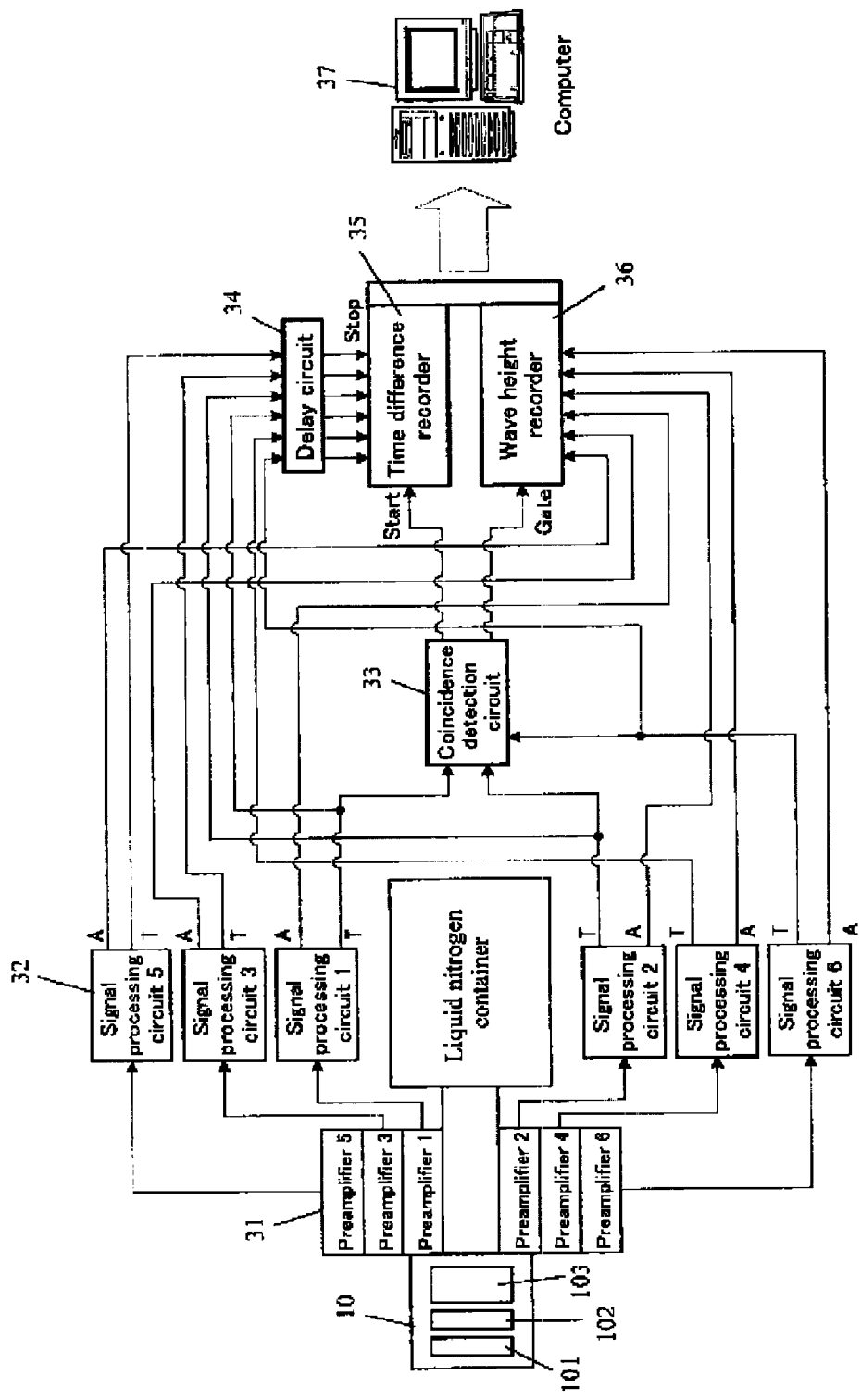
FIG. 10 is a schematic block diagram that illustrates an example of a signal processing section of a gamma-ray image pickup apparatus according to the present invention.

FIG. 10 is a schematic block diagram that illustrates an example of a signal processing section of a gamma-ray image pickup apparatus according to the present invention. First-stage, second-stage and third-stage detecting elements 101, 102, and 103 of the detection section 10 are secured to a copper cold finger cooled with liquid nitrogen inside a liquid nitrogen container, and cooled. Signals from the multiple anode strips and multiple cathode strips provided in the first-stage detecting element 101 are amplified by respective preamplifiers. Similarly, signals from the multiple anode strips and multiple cathode strips provided in the second-stage detecting element 102, and signals from the multiple anode strips and multiple cathode strips provided in the third-stage detecting element 103 are also amplified by respective preamplifiers. In FIG. 10, the preamplifiers that are connected to the cathode strips and anode strips of the first-stage detecting element 101 are represented by a preamplifier 1 and a preamplifier 3, respectively, the preamplifiers that are connected to the cathode strips and anode strips of the second-stage detecting element 102 are represented by a preamplifier 2 and a preamplifier 4, respectively, and the preamplifiers that are connected to the cathode strips and anode strips of the third-stage detecting element 103 are represented by a preamplifier 5 and a preamplifier 6, respectively.

Figure 11:
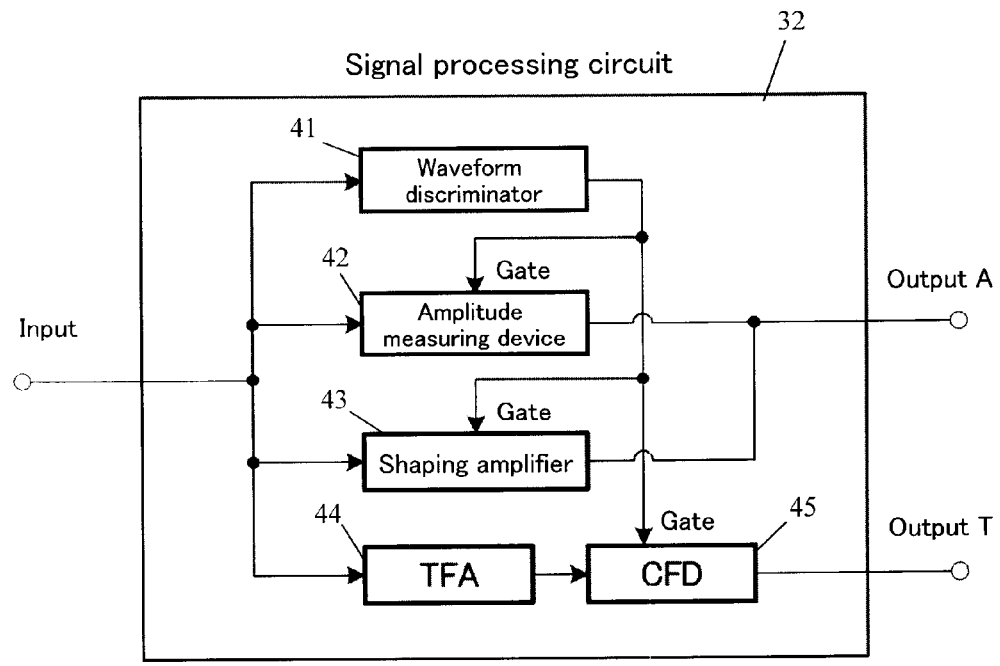
FIG. 11 is detailed view of a signal processing circuit.

The output signal of each preamplifier is input to a signal processing circuit 32 that is shown in detail in FIG. 11. When an input signal belongs to a DOI strip, the signal processing circuit 32 outputs an energy signal to output A and outputs a time signal to output T. When the input signal does not belong to a DOI strip, the signal of the output A is utilized for TOI measurement, and no signal is output to the output T. As illustrated in FIG. 11, the signal input to the signal processing circuit 32 is divided into four signals, and input to a waveform discriminator 41, an amplitude measuring device 42, a shaping amplifier 43, and a TFA 44, respectively.

The operation of each element circuit shown in FIGS. 10 and 11 will now be described. A preamplifier 31 used here is called a "charge-sensitive preamplifier", and outputs a signal having the wave height that is proportional to an amount of charge generated in a detecting element by interaction with a gamma ray. The waveform discriminator 41 is set so that a gate signal is output when the output waveform of the preamplifier 31 maintains a specific wave height even after 300 ns after a certain threshold is exceeded, and so that no signal is output when the preamplifier 31 does not maintain a specific wave height. The amplitude measuring device 42 is a circuit for outputting the difference between the maximum value and the minimum value of the output of the preamplifier 31. The shaping amplifier 43 generates a semi-Gaussian waveform to output a signal having a wave height that is proportional to the wave height of the preamplifier 31 with excellent accuracy. This circuit is realized by connecting an RC integrated circuit in multiple stages behind a CR differentiation circuit. The TFA (timing filter amplifier) 44 forms a bandpass circuit. In this case, a low-pass time constant is 50 ns, and a high-pass time constant is 500 ns.

Figure 12:
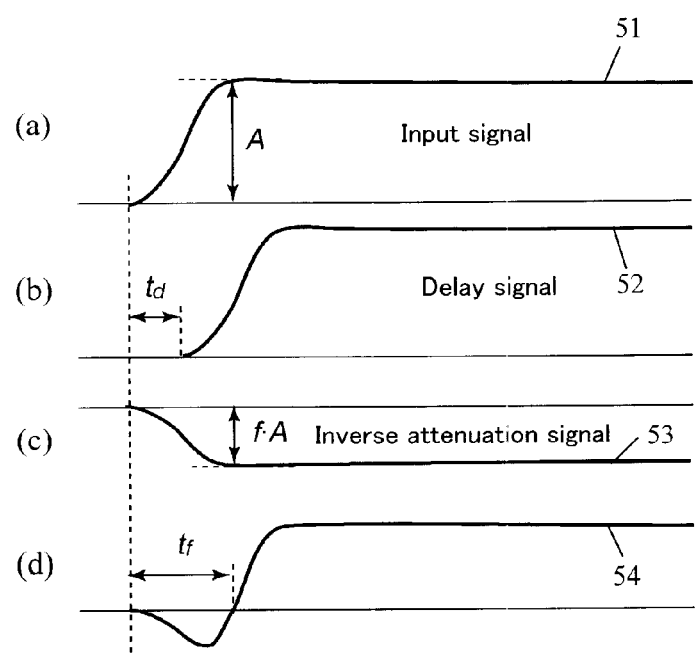
FIG. 12 is a view that describes an operation principle of a CFD.

A CFD 45 is a commercially available circuit called a constant fraction discriminator, and the operating principle thereof will now be described with reference to FIG. 12. An input signal 51 shown in (a) is divided into two signals to create a signal 52, as shown in (b), for which the input signal 51 is delayed by $t_d$, and a signal 53, as shown in (c), for which the input signal 51 is inverted and whose amplitude is multiplied by f. Thereafter, as shown in (d), when a signal 54 is created by adding together the signals 52 and 53, a time $t_f$ at which the wave height thereof is 0 is a time obtained by adding $t_d$ to the time taken for the wave height of the input signal 51 to reach the maximum value multiplied by f. Thus, the time taken to reach the maximum value of the wave height multiplied by f can be known by making a signal of a rising waveform or a falling waveform pass through the CFD.

A coincidence detection circuit 33 is a circuit that outputs a gate signal when the time difference of an input signal is shorter than a setting value. The width and delay time of the gate signal are variable. The coincidence detection circuit 33 selects an event in which gamma ray interaction is detected with only any two among the three detecting elements 101, 102, and 103, and acquires data. A time difference recorder 35 is a circuit that records a time difference between a start signal and a stop signal using the gate signal output of the coincidence detection circuit 33 as the start signal, and using the signal in which the output T of the signal processing circuit 32 is delayed through a delay circuit 34 as the stop signal. A wave height recorder 36 is a circuit that records the maximum value of the wave height of the signal for the output A of the signal processing circuit 32 while the gate signal of the coincidence detection circuit 33 is being output.

Next, the operation of the signal processing section shown in FIGS. 10 and 11 is described. The waveform discriminator 41 checks whether or not an input signal belongs to a DOI strip. When the input signal belongs to a DOI strip, a gate signal is output, and the output signal of the amplitude measuring device 42 is not output. At the same time, a configuration is adopted such that the output signals of the shaping amplifier 43 and the CFD 44 can be output. Conversely, when the input signal does not belong to a DOI strip, a gate signal is not output, output of the output signal of the amplitude measuring device 42 is enabled, and output of output signals of the shaping amplifier 43 and CFD 44 is disabled. When the input signal does not belong to a DOI strip, the amplitude measuring device 42 measures and outputs the difference between the maximum value and the minimum value of the input signal. The shaping amplifier 43 generates a signal of a waveform suitable to energy measurement. The TFA 44 generates a signal of a waveform suitable to time measurement. The output of the TFA 44 is input to the CFD 45, and an output signal is generated when 50% of the maximum value of the wave height is reached.

When it is assumed that the signals of a signal processing circuit 1, a signal processing circuit 2, and a signal processing circuit 6 belong to a DOI strip, respective signals of output T are input to the coincidence detection circuit 33. When the time difference between the input signals of these signal processing circuits is shorter than a certain setting value, a gate signal is output from the coincidence detection circuit 33 to actuate the time difference recorder 35 and the wave height recorder 36. A stop signal of the time difference recorder 35 is generated by making a signal of output T pass through the delay circuit 34. A signal of output A is input to the input of the wave height recorder 36.

Figures 13, 14:
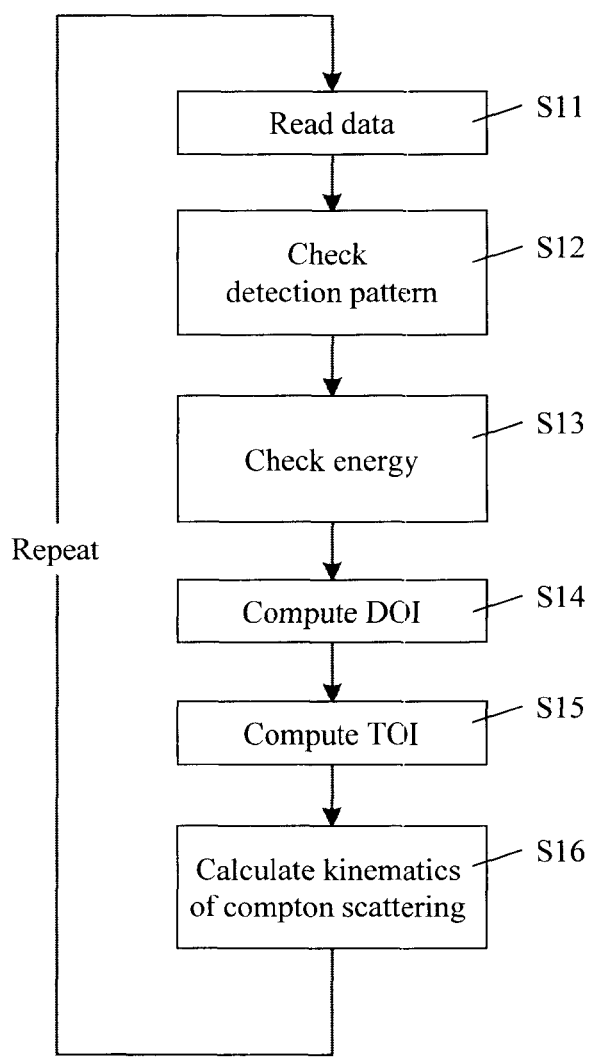
FIG. 13 is a view that shows details of data that is transferred to a computer.
FIG. 14 is a flowchart of data processing by the computer.

As described above, the output T of the signal processing circuit 32 is only output with respect to a signal of a DOI strip. That is, data is created only in a channel that corresponds to the DOI strip, of the time difference recorder 35. Further, among the data of the wave height recorder 36, the data that corresponds to that channel and the data of the adjacent channels on both sides of that channel are transferred by data transfer processing. The data of the time difference recorder 35 and the wave height recorder 36 is transferred to a computer 37 for each measurement event, and processing for image generation is executed. FIG. 13 shows the details of the data that is transferred.

In FIG. 13, reference characters $t_1$ to $t_4$ denote data of the time difference recorder 35. Reference characters $t_1$ and $t_3$ denote data of cathode strips and anode strips of a scattering detector, and reference characters $t_2$ and $t_4$ denote data of cathode strips and anode strips of an absorption detector. In each piece of data, ID information for identifying a channel and a numerical value obtained from the relevant channel are recorded as a set. Reference characters $E_1$ and thereafter denote data of the wave height recorder 36. Reference characters $E_1$ and $E_3$ denote data obtained for the DOI strips of the cathode and anode, respectively, of the scattering detector. Reference characters $E_2$ and $E_4$ denote data obtained for the DOI strips of the cathode and anode, respectively, of the absorption detector. Reference characters $A_{1+}$ and $A_{1-}$ denote data obtained for adjacent strips (TOI strips) on both sides of the DOI strip of the cathode of the scattering detector. Reference characters $A_{2+}$ and $A_{2-}$ denote data obtained for adjacent strips (TOI strips) on both sides of the DOI strip of the cathode of the absorption detector. Reference characters $A_{3+}$ and $A_{3-}$ denote data obtained for adjacent strips (TOI strips) on both sides of the DOI strip of the anode of the scattering detector. Reference characters $A_{4+}$ and $A_{4-}$ denote data obtained for adjacent strips (TOI strips) on both sides of the DOI strip of the anode of the absorption detector.

FIG. 14 shows a flow of data processing by the computer 37. This processing is repeated for the number of detection events. After data is read in step 11, a detection pattern is checked in step 12. Here, the detection pattern is checked based on the data of the time difference recorder 35. When data exists in a certain channel of the time difference recorder 35, it indicates that the strip that is the source of the data is a DOI strip. In this case, the processing advances to the next step only in a case in which only one strip, respectively, among the strips of the respective anodes and cathodes of the scattering detector and absorption detector is a DOI strip. When there are two or more DOI strip signals, such as in a case in which two gamma rays are incident on a detecting element at the same time, the event is excluded from subsequent analyzing. Next, the energy is checked in step 13. This energy check is performed using the $E_1$ and $E_2$ of the wave height recorder 36. The processing advances to the next step only when the sum of $E_1$ and $E_2$ is equal to the energy of the gamma ray of interest. The DOI computation of step 14 is performed using the data of the time difference recorder 35. The DOI in the scattering detector is calculated from the difference between $t_1$ and $t_3$, and the DOI in the absorption detector is calculated from the difference between $t_2$ and $t_4$. The TOI computation of the subsequent step 15 is performed using the data of the wave height recorder 36. In this case, it is assumed that the dividing direction of the cathode is the X-axis direction, and the dividing direction of the anode is the Y-axis direction. The TOI in the X-axis direction of the scattering detector is calculated based on $A_{1+}$ and $A_{1-}$, and the TOI in the Y-axis direction of the scattering detector is calculated based on $A_{3+}$ and $A_{3-}$. Similarly, the TOI in the X-axis direction of the absorption detector is calculated based on $A_{2+}$ and $A_{2-}$, and the TOI in the Y-axis direction of the absorption detector is calculated based on $A_{4+}$, and $A_{4-}$. Thus, an interaction point in the scattering detector and in the absorption detector is obtained with high accuracy. Next, the processing advances to step 16 to calculate a Compton scattering angle $\theta$ by applying the energy $E_1$ detected at the scattering detector and the energy $E_2$ detected at the absorption detector to the above formula (2).

Thus, a circular cone as shown in FIG. 4 is calculated for each event of multiple detection events based on the information regarding an interaction point in the scattering detector, an interaction point in the absorption detector, and the Compton scattering angle $\theta$. Accordingly, events that are judged to be caused by gamma rays discharged from the same nuclide are collected based on the detected gamma ray energy E ($=E_1+E_2$). The position at which the nuclide exists can be determined by overlapping the circular cones that belong to the collection of events, and the spatial distribution of the source of the rays can be displayed as an image.

When there are a plurality of sums of $E_1$ and $E_2$ and a plurality of nuclides exist as gamma-ray sources, circular cones that are calculated based on the kinematics of Compton scattering are grouped according to energy for each nuclide. The position at which each nuclide exists can be determined separately by independently superimposing the circular cones for each nuclide.

When using the gamma ray detector of the present invention, low-energy gamma rays undergo Compton scattering mainly at a silicon detecting element, and the scattered gamma rays are detected at a germanium detecting element provided to the rear of the silicon detecting element. In contrast, since high-energy gamma rays tend to pass through the silicon detecting element, the high-energy gamma rays can be detected by two germanium detecting element in the conventional manner. It is therefore possible to detect with high efficiency gamma rays extending over a range from low-energy gamma rays of approximately 100 keV to high-energy gamma rays of approximately 2 MeV.

Figure 15:
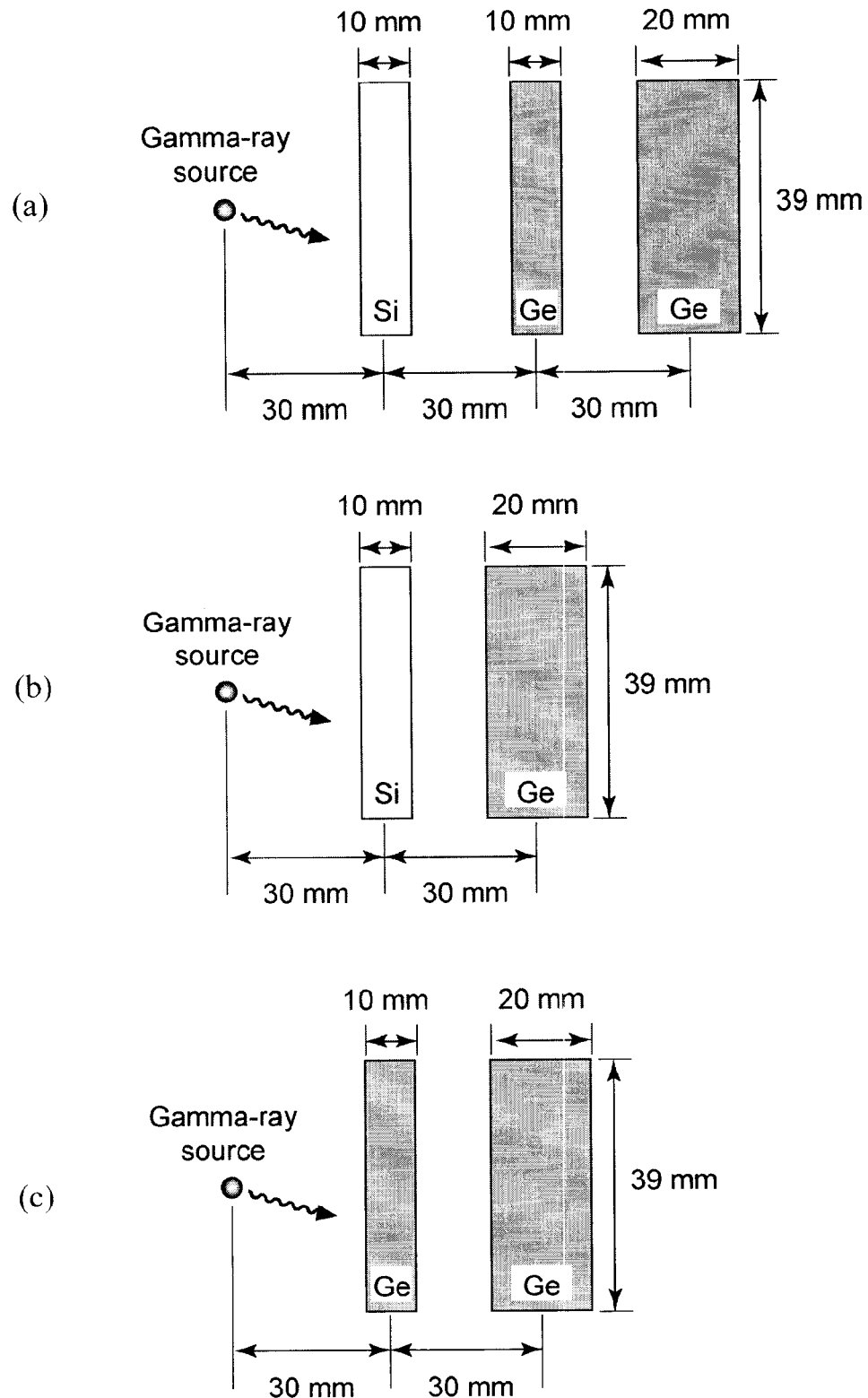
FIG. 15 is a view that shows a configuration example of a gamma ray detector.

An example will now be illustrated that evaluates to what degree detection efficiency is improved by the present invention. The gamma ray detection efficiency is compared for the combinations of gamma ray detecting elements shown in FIG. 15. FIG. 15(*a*) is a view that illustrates the combination of detecting elements employed in the gamma ray detector of the present invention. In FIG. 15(*a*), a case is assumed in which the first-stage detecting element comprises silicon of a thickness of 10 mm, the second-stage detecting element comprises germanium of a thickness of 10 mm, and the third-stage detecting element comprises germanium of a thickness of 20 mm. FIG. 15(*b*) is a view that illustrates a gamma ray detector as a comparison example, in which the first-stage detecting element comprises silicon of a thickness of 10 mm and the second-stage detecting element comprises germanium of a thickness of 20 mm. FIG. 15(*c*) is also a view that illustrates a gamma ray detector as a comparison example, in which the first-stage detecting element comprises germanium of a thickness of 10 mm and the second-stage detecting element comprises germanium of a thickness of 20 mm. In each case, it is assumed that the dimensions of the detecting elements are 39 mm×39 mm for length×height, a space between each detecting element is 30 mm, and a gamma-ray source is located 30 mm to the front of the first-stage detecting element.

Figure 16:
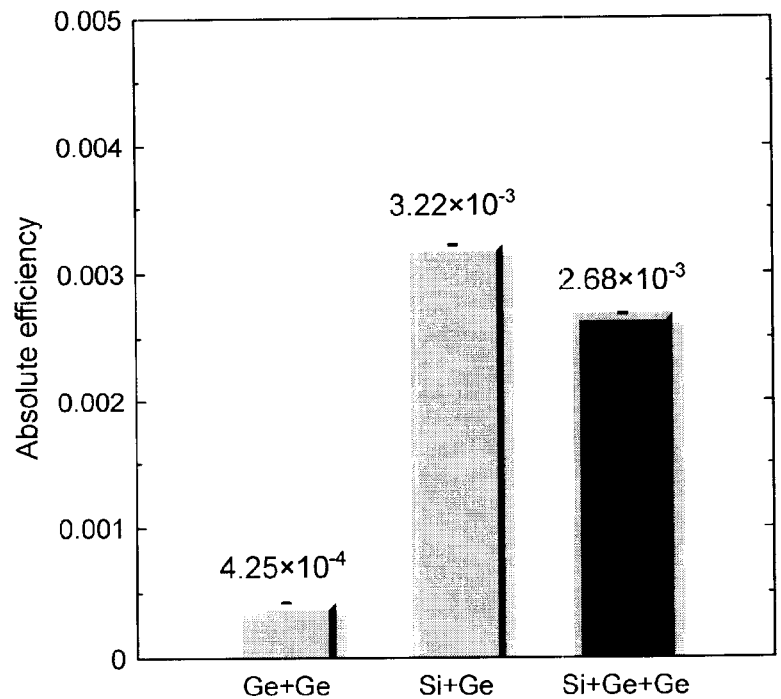
FIG. 16 is a view that illustrates a comparison of detection efficiencies of gamma ray detectors.
Figure 17:
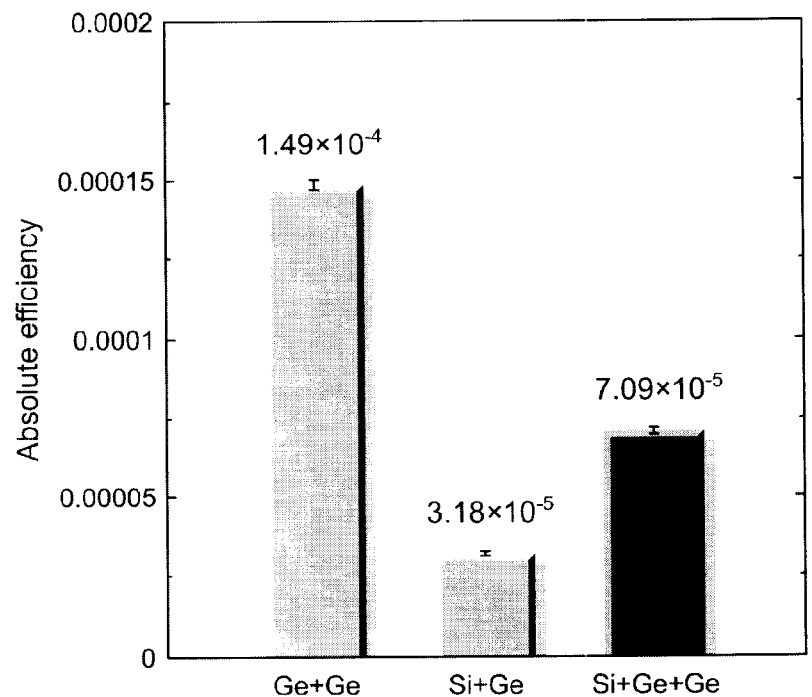
FIG. 17 is a view that illustrates a comparison of detection efficiencies of gamma ray detectors.

The detection efficiency of each of the detecting element combinations shown in FIG. 15 was compared by Monte Carlo simulation for a case of picking up images of gamma rays of 100 keV and 1000 keV discharged from the gamma-ray source. FIG. 16 shows the detection efficiencies in the case in which the energy of the gamma ray is 100 keV. FIG. 17 shows the detection efficiencies in the case in which the energy of the gamma ray is 1000 keV.

In FIG. 16 and FIG. 17, the characters "Ge+Ge" shown denote the gamma ray detector as a comparison example shown in FIG. 15(*c*), the characters "Si+Ge" denote the gamma ray detector for low energy shown in FIG. 15(*b*), and the characters "Si+Ge+Ge" denote the gamma ray detector according to the present invention shown in FIG. 15(*a*). It is found that when the gamma ray energy is 100 keV, although the detection efficiency of the detector with the Ge+Ge combination decreases remarkably, the detector with the Si+Ge+Ge combination achieves a detection efficiency that is equivalent to the detector with the Si+Ge combination. Furthermore, it is found that when the gamma ray energy is 1000 keV, the detector of the present invention achieves a detection efficiency that is more than twice that of the detector with the Si+Ge combination. Thus, according to the present invention, an apparatus capable of picking up images of gamma rays of an energy range from approximately 100 keV to 2 MeV with a high resolution and high efficiency can be realized by the Compton camera method.

Figure 18:
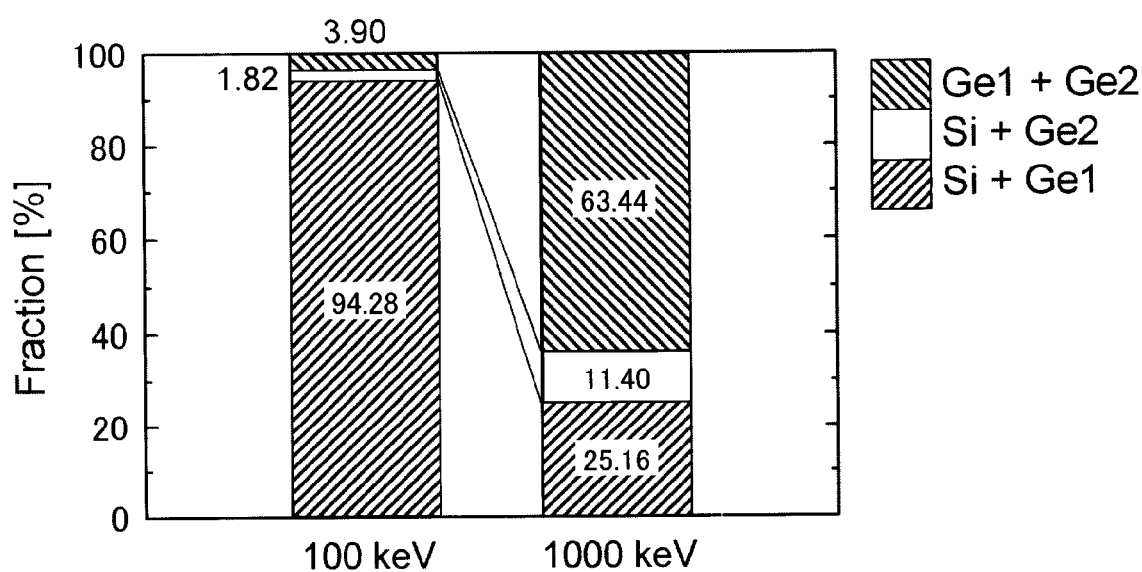
FIG. 18 is an explanatory view of combinations of detecting elements at which an interaction occurred.

FIG. 18 is a view that illustrates the frequency at which interactions occur with the respective detecting element combinations when picking up images with the gamma ray detector according to the present invention. In the figure, reference characters Ge1+Ge2, Si+Ge2, and Si+Ge1, denote a combination of the second-stage and third-stage detecting elements, a combination of the first-stage and third-stage detecting elements, and a combination of the first-stage and second-stage detecting elements, respectively. When the energy is 100 keV, 94.28% of interactions occur in Si+Ge1, and the contribution of the third-stage detecting element is small. However, it is found that when the energy is 1000 keV, 63.44% of interactions occur in Ge1+Ge2. More specifically, it is found that, with the present invention, the detection efficiency is improved over a range extending from low energy to high energy.

The invention claimed is:
1. A Compton imaging camera comprising a gamma ray detector, wherein:
the gamma ray detector comprises a structure in which a first-stage detecting element, a second-stage detecting element, and a third-stage detecting element are arrayed in order from a side on which a gamma ray is incident, the first-stage detecting element is a position-sensitive gamma ray detecting element for low-energy gamma rays, comprises only one planar silicon crystal as a gamma ray detecting crystal, and is capable of detecting an interaction position and energy of a gamma ray, each of the second-stage detecting element and the third-stage detecting element is a position-sensitive gamma ray detecting element for high-energy gamma rays, comprises only one planar germanium crystal as a gamma ray detecting crystal, and is capable of detecting an interaction position and energy of a gamma ray, and the gamma ray detector detects a gamma ray that is photoelectrically absorbed at the second-stage or third stage detecting element after being Compton scattered at the first-stage detecting element, and a gamma ray that is photoelectrically absorbed at the third-stage detecting element after being Compton scattered at the second-stage detecting element.

2. The Compton imaging camera gamma ray detector according to claim 1, further comprising a coincidence detection circuit that receives electronic information from each of the three position-sensitive gamma ray detecting elements, and that extracts only-events in which interaction of a gamma ray is detected at only two of the three position-sensitive gamma ray detecting elements.

3. The Compton imaging camera gamma ray detector according to claim 2, wherein the thickness of the second-stage detecting element is smaller than the thickness of the third-stage detecting element.

* * * * *